United States Patent [19]

Gannac

[11] 3,992,040

[45] Nov. 16, 1976

[54] SAFETY HARNESS FOR USE BY A CHILD IN A VEHICLE

[76] Inventor: Jean-Philippe Gannac, 32 Avenue Thierry, Ville d'Avray (Hauts-de-Seine), France

[22] Filed: June 30, 1975

[21] Appl. No.: 591,761

[30] Foreign Application Priority Data

July 9, 1974   France .............................. 74.23758

[52] U.S. Cl. ................................ 280/744; 280/747
[51] Int. Cl.² .......................................... B60R 21/10
[58] Field of Search .......... 280/150 SB, 150 B, 744, 280/747, 748; 297/389, 384, 385

[56] References Cited
UNITED STATES PATENTS

| | | | |
|---|---|---|---|
| 2,758,769 | 8/1956 | Nunn | 297/389 |
| 2,908,324 | 10/1959 | Muller | 297/389 |
| 3,099,486 | 7/1963 | Scott | 297/389 |
| 3,321,247 | 5/1967 | Dillender | 297/389 |
| 3,524,679 | 8/1970 | DeLavenne | 280/150 SB |

FOREIGN PATENTS OR APPLICATIONS 1,355,688   2/1963   France .............................. 297/389

*Primary Examiner*—Robert R. Song
*Attorney, Agent, or Firm*—Diller, Brown, Ramik & Wight

[57] ABSTRACT

A safety harness for use by a child in a vehicle, said harness having a waistcoat which carries a waistbelt provided with a buckle, a rear attachment member and shoulder straps which extend from the belt in regions to either side of the buckle and which are connected to the attachment member, and an attachment halter is connected to the control region of the attachment member, said halter being provided with means for securing it to fixed structure of the vehicle.

10 Claims, 4 Drawing Figures

SAFETY HARNESS FOR USE BY A CHILD IN A VEHICLE

BACKGROUND OF THE INVENTION

The present invention relates to a safety harness for children carried in automobiles.

It is well known that if there is an impact or sudden stop, the passengers in an automobile are propelled violently towards the front of the vehicle.

In order to lessen bodily injuries sustained by passengers, vehicles are generally equipped with safety belts in the front seats.

However, if a child occupies the seat next to the driver such safety belts are incapable of fulfilling this purpose.

As regards the rear seats, these are not generally provided with any safety device for preventing the passengers being propelled forwards following an impact.

With regard to children occupying the rear seats, which is generally the case, they are not held in by any means, which can have serious consequences.

SUMMARY OF THE INVENTION

An object of the present invention is to provide a child's safety harness which is simple and particularly practical in use, and which is aimed at limiting to a large degree bodily injuries to children transported in automobiles and who are sitting either next to the driver or in the rear seats.

For this purpose the invention proposes a safety harness for children transported in automobiles, said harness being of the type comprising a waistcoat which can be slipped on and is open at the front and provided with shoulder straps and an abdominal or waist strap in combination with means for securing it to the body of the vehicle, characterised in that the waistcoat is provided with a belt having a ventral instant open-and-close buckle, said shoulder straps starting from both sides of this buckle and terminating at the dorsal part of the belt on both sides of a dorsal attachment region, and in that at least one attachment halter starting from this region is provided with means for securement to the body of the vehicle, the starting point of the said halter being located substantially in the centre of the said dorsal attachment region.

Such an article, advantageously made of a light, ventilated fabric such as linen or the like, has the advantage that it is much easier to install on account of the central attachment region fixture, as well as being simple to use for children since it may be slipped on like a garment.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail certain illustrative embodiments of the invention, these being indicative however of but two ways in which the principle of the invention may be employed.

In said annexed drawings.

DESCRIPTION OF THE PREFERRED EMBODIMENTS

Figure 1:
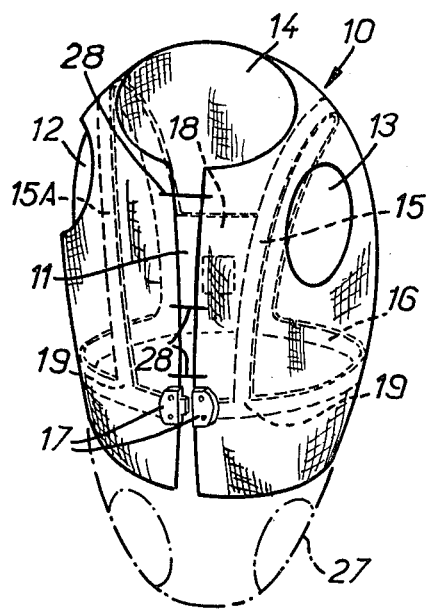
FIG. 1 is a perspective view of a safety harness according to the present invention.
Figure 2:
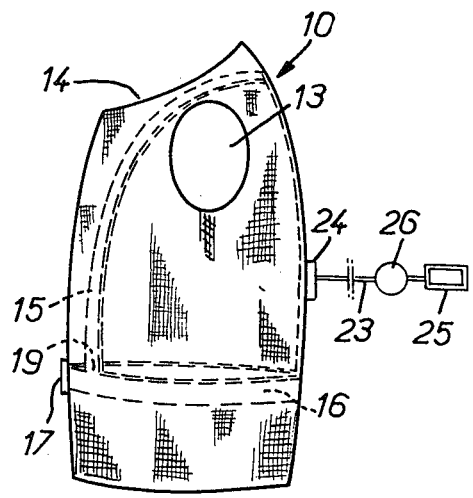
FIG. 2 is a side elevation of such a harness.
Figure 3:
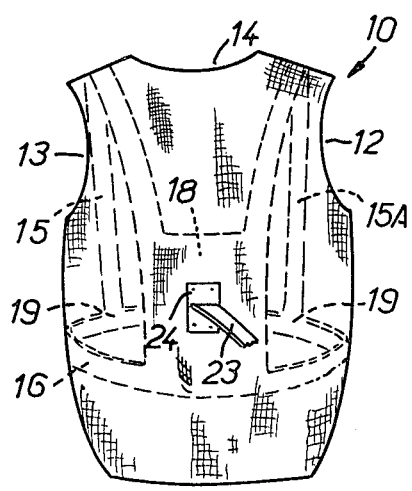
FIG. 3 is a rear elevation of such a harness.

Referring to FIGS. 1 to 3, the safety harness, generally indicated 10, comprises a waistcoat made of light, ventilated fabric such as linen or another material, open at the front at 11 and having armholes 12 and 13 and a neck portion 14.

A pair of shoulder straps 15, 15A and a belt 16 are incorporated within this waistcoat, and the free ends of the belt 16 which terminate in the front are provided with an instant open-and-close buckle 17.

The pair of shoulder straps 15, 15A as well as the belt 16 extend from a central dorsal attachment region 18, the shoulder straps 15, 15A being themselves joined at the front at 19 to the belt 16.

In the example illustrated the afore-mentioned straps 15, 15A and the belt 16 are incorporated between two thicknesses of fabric of the waistcoat and are secured thereto by any suitable means, for example by stitching.

In a further embodiment the belts and strap may be incorporated in the waistcoat by means of fabric "tunnels," not shown in the diagrams and provided between the two thicknesses or even be provided on the outside of the waistcoat.

According to yet another embodiment, the straps and belt may be very simply stitched to the outside of the waistcoat so as not to produce any bumps or ridges on the inside thereof.

In the embodiment illustrated in FIGS. 1 to 3 it will be seen that the shoulder straps and the belt do not include any length adjustment means, which may be a disadvantage on account of the fact that children using the harness may be of different sizes.

Figure 4:
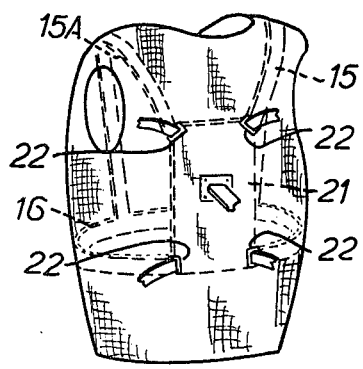
FIG. 4 is a perspective view from the rear of a variation of harness.

The safety harness shown in FIG. 4 is broadly similar to that illustrated in FIGS. 1 to 3, and comprises such adjustment means.

For this purpose the central dorsal attachment region of the belt 16 and the straps 15 and 15A consists of a plate 21 having a substantially rectangular shape, each corner of which comprises an attachment means 22 adapted to allow the shoulder straps 15, 15A and the belt 16 to be adjusted.

The afore-mentioned plate 21 may also be incorporated in the waistcoat, the attachment means 22 being left visible, or it may be carried on the exterior of the waistcoat, in which case the straps and the belt may also be secured to the exterior or incorporated in the waistcoat.

It should be pointed out that the attachment means 22 to which the shoulder straps are joined are oriented to give a slant to the said straps, whereas the attachment means 22 of the belt are oriented to give a horizontal direction to the latter.

By means of this arrangement the length of the shoulder straps 15, 15A and the belt 16 may be adjusted as desired.

In each of the examples shown a halter 23 is secured at 24 substantially in the centre of the dorsal attachment region 18 and 21.

The free end of this halter 23 is provided with an anchoring means 25 to a fixed point in the vehicle and may advantageously be equipped with an automatic inertia winding device 26, shown diagrammatically in FIG. 2.

Such a harness may be completed, as shown in FIG. 1, by a leg section 27 and also by closure means in the front of the waistcoat, diagrammatically shown at 28.

It is also possible to consider providing a two-piece halter, in particular with regard to securing it to a front seat of the vehicle.

Of course, the invention is not limited to the embodiments described as variations can be made without departing beyond the scope of the present invention as defined in the appended claims.

I, therefore particularly point out and distinctly claim as my invention:

1. A safety harness for use by a child in a vehicle, comprising:
   a waistcoat having a front opening;
   an abdominal belt carried by the waistcoat, said belt having a front region with front buckle means and a rear region;
   a pair of shoulder straps carried by the waistcoat, said shoulder straps being connected to the belt front region at both sides of the front buckle means and extending from said belt front region and connected to the belt rear region;
   said waistcoat having a rear attachment region defined between said shoulder straps above said belt rear region;
   and connecting means secured to said waistcoat rear attachment region and having means for securement to a fixed structure of a vehicle.

2. A safety harness as claimed in claim 1, wherein an attachment member is carried by the waistcoat in the rear attachment region.

3. A safety harness as claimed in claim 2 in which the belt and shoulder straps are integral with the attachment member.

4. A safety harness as claimed in claim 2, in which the belt and shoulder straps are connected to the attachment member by attachment means enabling their length to be adjusted.

5. A safety harness as claimed in claim 1, in which the belt and shoulder straps are incorporated between layers of the fabric of the waistcoat and secured thereto.

6. A safety harness as claimed in claim 1, in which the belt and shoulder straps are received in tunnels formed in the fabric of the waistcoat.

7. A safety harness as claimed in claim 1, in which the belt and shoulder straps are located on the outside of the waistcoat and secured thereto.

8. A safety harness as claimed in claim 1, provided with means for closing the front opening of the waistcoat.

9. A safety harness as claimed in claim 1, in which the connecting means includes a halter provided with an automatic winding device.

10. A safety harness as claimed in claim 1, in which the waistcoat is provided with a leg section extending from the bottom of the waistcoat for receiving a wearer's legs.

* * * * *